(No Model.)  3 Sheets—Sheet 1.

J. S. BALDWIN & B. W. BRADFORD.
ENGINE DERIVING ITS POWER FROM THE EXPANSION OF AIR OR GAS.

No. 355,634.  Patented Jan. 4, 1887.

Attest:
Fredk. F. Campbell
Wm. F. Zimmerman

Inventors:
James S. Baldwin,
Benjamin W. Bradford,
by Drake & Co. Attys.

(No Model.)

J. S. BALDWIN & B. W. BRADFORD.
ENGINE DERIVING ITS POWER FROM THE EXPANSION OF AIR OR GAS.

No. 355,634. Patented Jan. 4, 1887.

Attest:
Frdk F Campbell
Wm F Zimmermann

Inventors:
James S. Baldwin,
Benjamin W. Bradford,
by Drake & Co., attys.

UNITED STATES PATENT OFFICE.

JAMES S. BALDWIN, OF NEWARK, NEW JERSEY, AND BENJAMIN W. BRADFORD, OF NEW YORK, N. Y., ASSIGNORS TO THEMSELVES AND SAMUEL A. FARRAND, OF NEWARK, NEW JERSEY.

ENGINE DERIVING ITS POWER FROM THE EXPANSION OF AIR OR GAS.

SPECIFICATION forming part of Letters Patent No. 355,634, dated January 4, 1887.

Application filed February 6, 1886. Serial No. 190,980. (No model.)

*To all whom it may concern:*

Be it known that we, JAMES S. BALDWIN and BENJAMIN W. BRADFORD, citizens of the United States, residing, respectively, at Newark, in the county of Essex and State of New Jersey, and New York, county and State of New York, have invented certain new and useful Improvements in Engines Deriving their Power from the Expansion of Air or Gas; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of the invention is to secure a larger efficiency and economy than has heretofore been obtained in the conversion of heat, especially heat of a low temperature, into motive power.

The invention relates to engines which derive their power from the expansion of gas; and it consists of certain new or improved devices, arrangements, and combinations that may be employed therein or in co-operation therewith, substantially as hereinafter set forth, and finally embodied in the clauses of the claim.

The improved methods described herein for operating engines which derive their power from the expansion of gas will not be claimed in this specification, as they constitute the subject of a separate application.

Referring to the accompanying drawings, included in three sheets, in which like letters of reference indicate corresponding parts in each of the several figures, Figure 1, Sheet 1, is a front elevation showing in a general view the relations of the several parts of one form of said improved engine. Figs. 2, 3, and 10 are sectional views illustrating different modifications of construction in a vessel for generating power.

In said drawings, A' A² are generating-vessels or chambered receptacles adapted to hold liquid and gas for the generation of power, said power being generated or evolved from the heat contained in the liquid and thence transferred to the gas. These generators or generating-vessels are made, preferably, of plate metal and of cylindrical shape, although other shapes may be used if desired. Said generators are divided, preferably longitudinally, by partitions $b$ $b^2$, into chambers of the desired size, the chamber H being for hot liquid and chamber C for cold liquid. Chamber H is here shown about one half the size of chamber C, although these proportions may be varied. Each chamber is supplied, preferably, with about equal quantities of liquid and the remainder of the space with gas, said liquids and gas being retained and operated continuously or over and over within said vessel. The said partitions are secured to the generating-vessels, and are made, preferably, of sheet metal combined with any suitable non-conducting material. The partition $b^2$ is provided with an opening or passage-way, $b^3$, which is preferably a large rectangular orifice.

A movable head or partition, D, is arranged, preferably longitudinally, in chamber C, and is or may be secured to the rock-shaft D'' by the arms D', or by any other suitable means. Said head or partition is preferably made of or faced with some non-conducting material, and is or may be connected to the partition $b^2$ by any suitably-flexible material or combination of materials. The said connecting material being secured to all the edges of the head D, and also to the partition $b^2$, so as to entirely surround the orifice $b^3$, forms a corrugated bellows-like structure, B, open to the hot chamber, but closed to the cold chamber. This bellows, on opening, receives the hot liquid from chamber H through the orifice $b^3$, and on closing returns it through said orifice to said hot chamber, said orifice being the only means of ingress and egress to or from the interior of said bellows. The opening of said bellows diminishes the space for the cold liquid in chamber C, thereby causing the said liquid to fill said chamber and transfer the gas therefrom into the hot chamber H.

Figures 1, 2, 3:
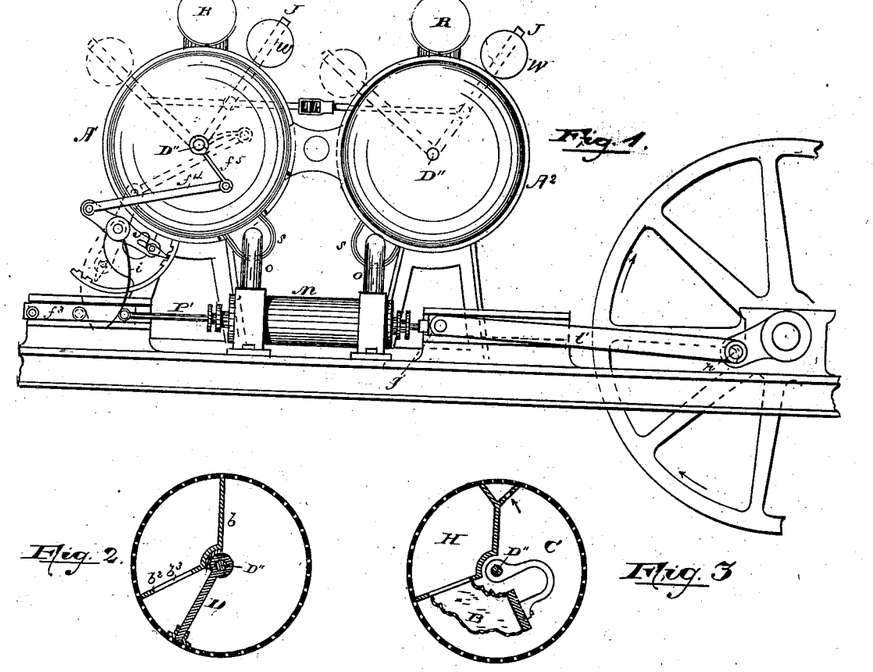

The flexible material, instead of being arranged in the aforesaid bellows form, may be constructed in the shape of a bag, as in Fig. 3, the partition or head D forming the bottom or end and the orifice $b^3$ the mouth thereof. In this case the head D may, if desired, be so shaped and arranged on the arms D' as to pass through the orifice $b^3$ and thereby empty the contents of said bag into chamber H at each returning movement of said head. The said flexible material may be entirely dispensed with, as in Fig. 2, and the outer edge of the head D be extended so as to move in contact with the interior surface of the generating-vessel, thereby separating the hot liquid from the cold. The movement of said head, acting as an oscillating or vibrating partition, imparts the same oscillating movements to said liquids and gas, displacing and replacing each alternately. In this case the partition $b^2$ may likewise be dispensed with, the oscillating partition or head D performing the functions of the said flexible material and the said partition $b^2$. Fig. 11 shows still another arrangement of the interior parts of a generating-vessel in which the liquids and the head D, instead of moving crosswise of said vessel, move longitudinally therein, the hot and cold liquids being separated from each other by the head D, attached to the rod $t$, a band, $d$, provided with suitable packing, being secured to the inside of the generating-vessel, so as to encircle said head D. If preferred, the said head D may in this arrangement be connected by a suitably-flexible material to the band $d$, forming thereby a bellows like structure substantially the same as that hereinbefore described. The reciprocating longitudinal movement of the said bellows or head D will alternately displace and replace each of the said liquids. As the liquids in each of these varieties of generators are used as mediums for moving the gas, any device employed for displacing and replacing said liquids will thereby cause said liquids to transfer the gas from the hot chamber to the cold and from the cold chamber to the hot alternately.

Figure 7:
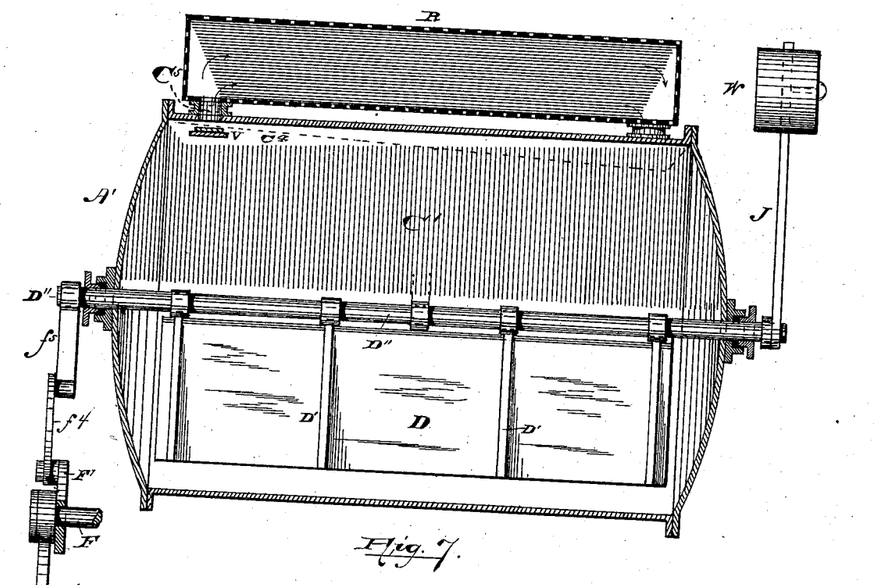
Fig. 7, Sheet 3, is a vertical longitudinal section of one of said generators in connection with a regenerator and actuating displacing mechanism.

Each of the chambers H and C contains an absorbing-pack, consisting of a series of subdivided or perforated parts or surfaces, arranged so as to be exposed to the action of the gas and the liquid of their respective chambers. These absorbing-packs are preferably constructed of closely-spaced thin metallic plates placed approximately parallel with each other, as illustrated at C', Fig. 7, but which may consist of wire-netting or other perforated or subdivided forms in any position that will admit an easy passage of liquid or gas through or between them, and of any material having the requisite absorbing or conducting quality. The variety of pack shown at C', Fig. 7, is preferably constructed so as to divide more or less completely the body of gas or liquid into a series of sheets, films, or thin sections, and thus cause each portion of said gas to come into immediate contact with some part of the said pack, thereby at once raising or lowering the temperature of said body of gas to that of the pack with which it is in contact. The very great extent of absorbing and conducting surfaces supplied by either variety of these packs and the subdivision and intimate commingling of the gas with said surfaces which may be thereby effected furnish, in connection with the liquids, the means of alternately heating and cooling said gas with the utmost rapidity, and thereby largely increase the efficiency both of the generators and the engine. In the hot chamber these packs are employed to absorb heat from the liquid and transmit it to the gas, while in the cold chamber they absorb the heat from the gas and transmit it to the liquid. The periodic immersing of said packs in the liquids of their respective chambers, or their contact with said liquids, maintains them at approximately the same temperatures as the said liquids. The said packs are preferably arranged so as to be dipped or exposed to the action of the liquid and gas alternately; but they may be employed without any such alternating action by placing one end or part of said packs in permanent contact with the liquid and leaving the other end or part in contact with the gas. Portions of the upper section of said packs may be omitted, as illustrated at $C^4$, Fig. 7, to provide channels for the more easy transfer of the gas from the hot or cold chamber through a regenerator, R. The said regenerator is provided with absorbing-packs, which may be of similar material to those described for use in the hot and cold chambers. One end or part of the regenerator is in communication with the hot chamber and is thereby kept hot, and the other end or part is in communication with the cold chamber and is thereby kept cold. The function of the regenerator is to absorb and withdraw the heat from the gas when it is passing from the hot to the cold chamber, thereby cooling the gas before it enters the cold chamber, and likewise saving the heat, and to restore the said heat to the gas on its return from the cold to the hot chamber, thereby heating the gas before it re-enters the said hot chamber. Every time, therefore, that the gas is transferred to and fro through the regenerator it is therein alternately cooled and heated.

Instead of a regenerator, a simple duct or passage of any kind may be employed through which to transmit the gas from one chamber to the other; but the use of a regenerator secures the largest economy of heat.

Valves V, of any preferred construction, may be employed in the hot and cold chambers to automatically open and close the entrance to the pipes $C^5$, leading from said chambers to the regenerator. Said valves are or may be actuated by the liquid in said chambers, being opened by the falling and closed by the rising of said liquid, thereby rendering it impossible for any of said liquids to pass from said chambers through the regenerator, while freely admitting the ingress and egress of the gas to and fro from said chambers through the regenerator. Said valves may be dispensed with and the same purpose accomplished by slightly elongating the pipes $C^5$, said pipes acting as hydrostatic columns, thereby neutralizing at the proper period any preponderance of weight or force in the counter balance, hereinafter described, and so preventing the ascent of the liquid into the regenerator.

Figures 5, 6:
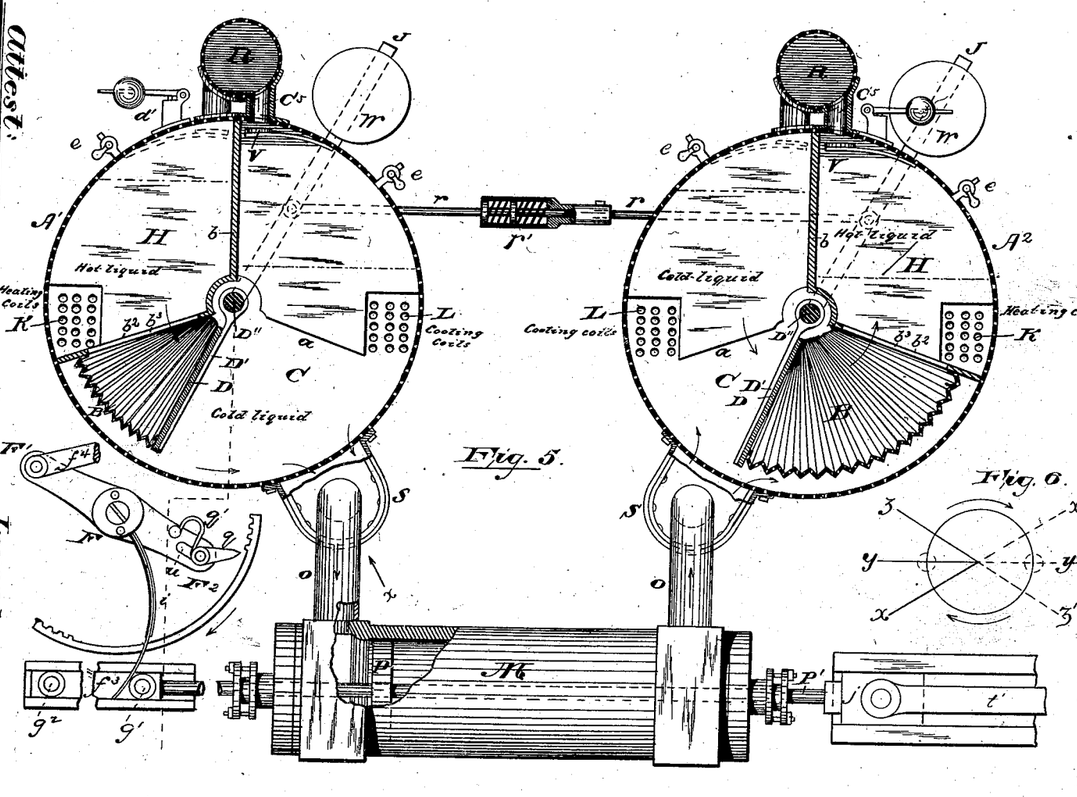
Fig. 5, Sheet 2, is a front view of the working portions of the engine shown in Fig. 1, the power-generating vessels A' A², together with the regenerators R R, being in section to illustrate the arrangement of parts therein.
Fig. 6 is a diagram illustrating the position of a certain crank-pin when the various displacements of the liquid and gas take place within the generators.
Figure 8:
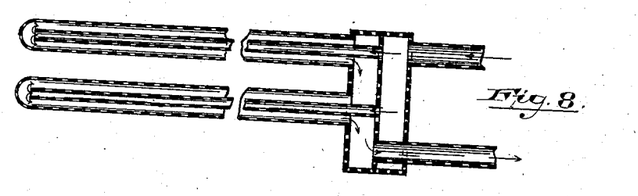
Fig. 8 is a sectional view of a coil by means of which heat may be supplied to the hot chamber or removed from the cold chamber of said generators.

Heating-coils K K are or may be placed in chambers H H, for supplying heat to the liquids therein, and cooling-coils L L in chambers C C, for keeping the liquids therein cool. Said coils are illustrated in Figs. 5 and 8, and contain in themselves no elements of novelty. Heat from any source whatever, but preferably exhaust-steam, is furnished to the heating-coils, and cold water or other fluid to the cooling-coils, thereby keeping the contents of chambers H H hot and of chambers C C cool. Said coils may be placed outside of the said generators and be suitably connected therewith. Any other variety of apparatus may be employed instead of said coils to secure the desired thermal conditions of the said liquids.

Valves or faucets $e\ e$ may be inserted in or connected with the chambers H and C, through which the generators may be charged with the desired liquids and gas, by a pump or other injector, until the requisite internal pressure is attained, when said valves may be closed. The said pressure is always considerably greater than that of the external atmosphere, and may extend to a number of hundred pounds to the square inch, being limited only by the strength of the generators.

Should any loss of gas or liquid take place from the generators, either by leakage or otherwise, the amount may be readily restored, without arresting the running of the engine, by simply opening the aforesaid valves and operating said pump or injector to the extent desired. It will therefore be observed that in this invention the contents of the generators, like those of a steam-boiler, are capable of performing their various operative functions independent of the pressure of the external atmosphere or isolated from communication therewith, while, if required, a continuous or an intermittent supply of liquid or gas from any source may at any time be promptly furnished to said generators without arresting or interfering with their continuous operations. It is therefore in this operative sense only, and not in the sense of absolute isolation, that the term "isolated" is used in the claims forming part of this specification.

Figure 9:
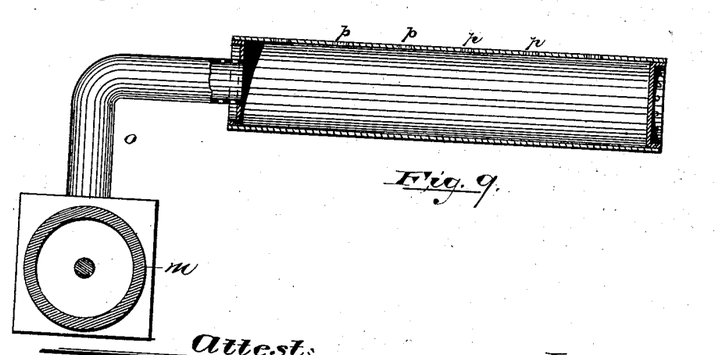
Fig. 9 is a sectional view of a supplemental chamber or extension, taken through line $x$ of Fig. 5.
Figure 10:
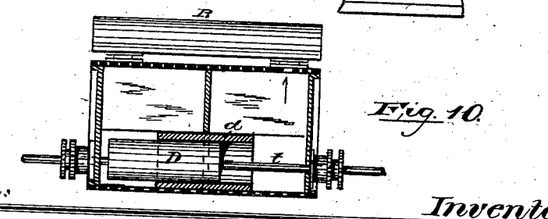

A safety-valve, $d'$, is preferably applied to each generator as a protection against excessive pressure. A supplemental chamber or extension, S, Figs. 5 and 9, is or may be secured to the generator and communicate therewith by an opening or, preferably, by a series of openings or perforations, $p\ p$, Fig. 9, extending from the interior of said chamber into the interior of the generating-vessel. The said extension may have access through any part of the generating-vessel, but is preferably connected so as to communicate with the cold chamber thereof, as shown at Fig. 5. Said supplemental chamber may communicate with the piston-cylinder M or other motive mechanism of an engine by any suitable pipe, duct, or port, O. The said extension may have access to the hot chamber of the generating-vessel, and the hot liquid instead of the cold be used as the medium for transmitting power from the generator to the engine; or the said extension may be entirely dispensed with and the said pipe or duct O be arranged so as to communicate directly with either the hot or the cold chamber of said generator; or the said pipe or duct may be inserted in the upper part of the generating-vessel and either the hot or the cold gas therein, instead of the said liquids, be employed as the medium for transmitting the power generated therein to the motive mechanism of the engine.

The piston-cylinder M is or may be provided at each end with pipes or ducts O, but otherwise possesses no features of novelty.

The piston-rod P' runs or may run through both ends of the piston-cylinder, one end being attached to the cross-head $j$, and thence, by a connecting-rod, $t'$, and crank-pin $h$, to a crank-shaft and fly-wheel, in any of the usual ways. The other end of the piston-rod is or may be attached to another cross-head or slide, $f^3$, running in suitable guideways and provided with studs $g'\ g^2$, each of said studs being adapted to alternately actuate a spring, $i$, as shown in Figs. 1 and 5. The inner end of this spring is fastened to a shaft or pin, F, on which are secured oscillating cross-arms $F'\ F^2$, said spring acting as a lever to rock or oscillate said arms in opposite directions alternately. The end of the arm F' is pivoted to the connecting-rod $f^4$, the other end of said rod being pivoted to the elastic arm $f^5$, Fig. 1, which is secured to and actuates the rock-shaft D'', thereby opening or closing the bellows B and effecting the various alternate displacements of the contents of said generating-vessel, as will be hereinafter more fully set forth. The said rock-shaft D'' runs or may run through both the heads of the generating-vessel, and is provided with suitable bearings and stuffing-boxes.

To the extremity of the shaft D'' is secured a long arm, J, carrying a counter-balance, W, which said counter-balance preferably slightly overbalances the weight of the liquid operating against either side of the bellows or head D, thereby enabling said liquids and gas to be alternately oscillated or transferred from point to point in said generating-vessel with the expenditure of comparatively little power.

One end of the arm F² carries a pawl, q, secured thereto by a pin or bolt which passes through the slot u and slides longitudinally therein. A spring, q', is secured to said arm, one end of which presses against said pin, and tends to keep it against the outer end of the slot, thereby keeping the point of the pawl in the teeth of the rack until the tension of said spring is overcome by the superior tension induced in spring i by the action of the piston-rod. As often as the movement of the piston nears its limit at the left-hand end of the cylinder the tension induced in spring i will act on the arms F' F², forcing the end of the pawl out of the teeth at the upper end of the curved segment m, as shown in Fig. 5, thereby rotating said arms until the pawl is carried from the teeth in the upper end into those in the lower end of said segment, as indicated by the dotted lines in Fig. 1. This action of the oscillating arms F' F² carries the counter-balance W over to the left side of the generator and simultaneously opens the bellows in A', and imparts to the liquids therein a movement which changes their relative positions, causing the cold liquid to rise to the top of the chamber C and the cold gas to pass from said chamber into the hot chamber H, thereby changing the pressure in said generator from its minimum to its maximum degree. The reverse movement of the piston brings the stud g² against the spring i, and as said piston nears its limit at the right-hand end of the cylinder said spring i presses the pawl out of the teeth in the lower end of the segment m and carries it into those in the upper section thereof, thereby closing the bellows in said generator and transferring the counter-balance and the contents of the generator to their former position.

It will be seen from the above that the displacing and replacing movements of the gas are in each case effected when said piston is at the end of its stroke and while the crank-pin h is passing the dead-centers, or from x to z, Fig. 6.

Numerous varieties of mechanism other than those shown in the drawings may be employed for transmitting motion from the engine to the displacing-bellows or movable head within the generating-vessel.

Figure 4:
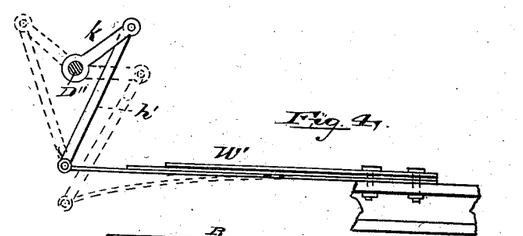
Fig. 4 shows a device that may be used in said engine as an equivalent for a counterbalance-weight.

The counterbalance-weight W may be dispensed with and a spring or other device used as an equivalent therefor. One variety or form of spring which may be thus used is shown in Fig. 4, in which W' is a spring under tension, its normal position being shown by the dotted lines underneath it; D'', a rock-shaft running through a generating-vessel, and k an arm connecting said rock-shaft with said spring by means of a rod, h'. Any movement imparted to said rock-shaft will increase or decrease the leverage of the arm k, and thereby so actuate the said spring as to counterbalance the weight of the liquids when raised above their normal level and facilitate their alternate displacement and replacement by the bellows or movable head, as hereinbefore set forth. The dotted lines on the left in said Fig. 4 show the relative position of the arm k and rod h' when reversed and acting on the opposite side.

The arms J J, carrying the counterbalance-weights W W, are or may be connected to each other by a rod, r r, and thereby both of said counter-balances be moved to and fro in either direction simultaneously and by the use of one actuating mechanism only—viz., the spring i and its several connections or substitutes. This action of said rod on the said arms J J is thereby transmitted to the contents of the generators and causes the transfer of the gas therein from one chamber to the other in each generator simultaneously. Various other devices instead of said rod may be employed to effect this simultaneous transfer of the gas in each generator, but the rod is one of the simplest. The said rod may consist of one piece, but is preferably constructed with a joint, as shown at r', so as to allow a limited independent motion to either of said counter-balances after the motion of the other has ceased. This slight independent movement is provided for in the coupling shown at r' by the spring therein, which spring allows a slight movement to either section of said rod after the motion of the other has been arrested. The purpose of this independent movement will be hereinafter set forth in describing the operation of the engine.

The generators A' A² correspond with each other, except that the hot and cold chambers, as well as the bellows in either generator, are in a transposed or opposite relation to those in the other. By this arrangement of the parts in each and their co-ordinate and simultaneous action the opening of the bellows in one generator closes the bellows in the other, and the resulting transfer of the gas from the cold to the hot chamber in the former will be accompanied with a like transfer from the hot to the cold chamber in the latter. From this it follows that whenever the gas is at its highest temperature and tension in one generator it will be at its lowest in the other, and consequently whenever the liquids in one generator are at their maximum pressure those in the other will be at their minimum, and vice versa.

As herein shown, the pressure in each generator is at all times acting against its respective end of the piston P. Therefore said piston when free to move must travel from that end of the cylinder at which the maximum pressure is acting and toward the end having the minimum pressure. The aggregate difference between these two pressures will represent the operative power acting on the piston of said engine. This difference of pressure will correspond in amount with the difference in temperature between the hot and cold liquids in said generators, said differential temperature being the source and measure of said power.

As the power of the engine is derived from the differential temperature of the liquids confined therein, we can obtain the same amount of power by keeping one of said liquids at a temperature of 150° and the other at 50° as by keeping one at 200° and the other at 100°, the power being due not to the intensity of the heat applied, but to the difference between the two temperatures, as aforesaid. The invention therefore enables us to utilize heat of even a very low temperature and to convert it into available motive power.

The operation of said engine is substantially as follows: The generators having been charged and the desired differential temperature obtained between the hot and cold chambers, as hereinbefore set forth, the shifting of the counter-balance, either by the hand or otherwise, from the right to the left side of the generator A' will open the bellows therein and impart a movement to the liquids and gas in said generator, changing their relative positions, causing the heated liquid in chamber H to descend and occupy the interior of the bellows and the cold liquid in chamber C to ascend and fill the space in said cold chamber, thereby driving the gas out of said cold chamber into the hot chamber, where, coming in contact with the hot plates C', its temperature will be increased in proportion to the difference in temperature between said cold and hot chambers. Simultaneous with these movements in A' a corresponding series of counter-movements will have taken place in A², and the gas in this generator will have had its tension thereby decreased in a corresponding degree. The gas and liquid in A' will now be under their maximum pressure, and will therefore drive the piston P toward the generator A², forcing the gas or liquid in front of said piston back into this generator and thereby compressing the gas in the cold chamber thereof to its original volume. When said piston nears the end of its stroke toward said generator A², the stud $g^2$, acting on spring $i$, as hereinbefore explained, will, while the crank-pin $h$ is passing the dead-center, cause said spring to change the position of the liquids and gas in each generator and thus develop the maximum pressure in A², thereby reversing the direction of the force and driving said piston back against the minimum pressure of the generator A'. Said piston, therefore, moves in either direction with the differential force due to a high pressure on one side thereof and a lower pressure on the other side. By the repetition of these alternating movements a continuous motion is imparted to the piston or other motive mechanism, which thereby rotates the fly-wheel.

With a suitable fly-wheel or other appropriate medium for the storage or transmission of power, the generator A² might in some cases be dispensed with, the power imparted to said wheel or other medium by the outgoing stroke of the piston under the maximum pressure of one generator enabling said wheel to make the return-stroke of said piston against the minimum pressure of said generator.

Whenever the gas is transferred to the hot chamber of one generator the liquid in the cold chamber thereof occupies all the space in said cold chamber, and the further opening of the bellows or head D is thereby arrested until the outflow of said cold liquid commences. In order that said outflow may take place without lowering the level of the liquid in said cold chamber, the further opening and extension of the bellows or head D is caused to continue therein as far as said outflow provides additional space therefor. Conversely, in the other generator the gas is in the cold chamber, and the hot chamber is filled with the hot liquid. The return of the cold liquid and consequent compression of the gas is thereby confined to the cold chamber. By these means the expansion of the gas is or may be confined to the hot chamber and its compression to the cold chamber, and by so confining them the gas in the hot chamber is maintained at its maximum temperature during the outflow of the liquid or gas from the generator, thereby imparting the increased tension of said gas to said outflowing fluid during practically the whole period occupied by said outflow. The aforesaid further opening and extension of the bellows or head D in either generator is or may be effected through the differential or independent movement permitted to the counter-balance connected therewith. The joint in the rod $r$ $r$, hereinbefore explained, allows the requisite amount of differential or independent movement to each counter-balance, and thereby to each bellows or head D, the said differential movement of said bellows or head being equal to and limited by the said outflow. In the drawings, Fig. 5 shows the bellows in A' in the act of opening and in A² closing in a corresponding degree. When fully open either bellows would extend to the line $a$.

In this specification the terms "hot" and "cold" are used in a purely relative sense, hot simply signifying the warmer and cold the cooler of the things referred to. The term "gas" is herein used in a broad generic sense to designate any aeriform body except vapor, the vapor arising from the liquids employed in the generating vessels being non-essential.

The gas used in said engine is preferably atmospheric air, but any other suitable gas or combination of gases may be thus employed. The liquids likewise are preferably water covered with a stratum of oil, though other liquids may be used in lieu thereof or in combination therewith.

We are aware that various other means and modifications than those herein described may be employed in utilizing the several features of our invention. We do not therefore wish to be understood as limiting ourselves in any manner to the specific forms or varieties of devices, processes, or methods herein shown and described.

Having thus described the invention, what we herein claim as new is—

1. In an engine deriving its power from the expansion of gas, the combination of a generator provided with a hot and a cold chamber holding, respectively, a hot and a cold liquid in contact with gas, said liquids being isolated from the pressure of the external atmosphere, and mechanism adapted to cause the rising of the liquid in the cold chamber to be accompanied with a lowering of the liquid in the hot chamber, thereby admitting an inflow of gas into said hot chamber, substantially as set forth.

2. In an engine deriving its power from the expansion of gas, the combination of a generator provided with a hot and a cold chamber holding, respectively, a hot and a cold liquid in contact with gas, said liquids being isolated from the pressure of the external atmosphere, and mechanism adapted to cause the rising of the liquid in the hot chamber to be accompanied with a lowering of the liquid in the cold chamber, thereby admitting an inflow of gas into said cold chamber, substantially as set forth.

3. In an engine deriving its power from the expansion of gas, the combination of a generator provided with a hot and a cold chamber holding, respectively, a hot and a cold liquid in contact with gas, said liquids being isolated from the pressure of the external atmosphere and operated over and over without removal from the generator, and mechanism adapted to cause said liquids to alternately increase and decrease the temperature of said gas for the evolution of power, substantially as set forth.

4. In an engine deriving its power from the expansion of gas, the combination of a generator having a hot and a cold chamber containing, respectively, a hot and a cold liquid in contact with gas, said liquids being isolated from the pressure of the external atmosphere, and mechanism adapted to cause the upper section of said cold chamber to be occupied with liquid and gas alternately, substantially as set forth.

5. In an engine deriving its power from the expansion of gas, the combination of a generator having a hot and a cold chamber containing, respectively, a hot and a cold liquid in contact with gas, said liquids being isolated from the pressure of the external atmosphere, and mechanism adapted to cause the upper section of each of said chambers to be occupied with liquid and gas alternately, substantially as set forth.

6. In an engine deriving its power from the expansion of gas, the combination of a generator having a hot and a cold chamber holding, respectively, a hot and a cold liquid in contact with gas, said liquids being isolated from the pressure of the external atmosphere, and mechanism adapted to cause the cold liquid to transfer said gas from the cold to the hot chamber, substantially as set forth.

7. In an engine deriving its power from the expansion of gas, the combination of a generator having a hot and a cold chamber holding, respectively, a hot and a cold liquid in contact with gas, said liquids being isolated from the pressure of the external atmosphere, and mechanism adapted to cause said liquids to alternately transfer said gas to and fro from one chamber to the other, substantially as set forth.

8. In an engine deriving its power from the expansion of gas, the combination of a generator having a hot and a cold chamber holding, respectively, a hot and a cold liquid in contact with gas, said liquids being isolated from the pressure of the external atmosphere, and mechanism adapted to cause said liquids to transfer said gas to and fro from one chamber to the other, the gas going and returning through the same channels, substantially as set forth.

9. In an engine deriving its power from the expansion of gas, the combination of a generator containing hot liquid in contact with gas, mechanism, substantially as set forth, adapted to alternately displace and replace said liquid and gas, and a counter-balance constructed and arranged to facilitate or control said displacements, substantially as set forth.

10. In an engine deriving its power from the expansion of gas, the combination of a generator containing cold liquid in contact with gas, mechanism, substantially as set forth, adapted to alternately displace and replace said liquid and gas, and a counter-balance constructed and arranged to facilitate or control said displacements, substantially as set forth.

11. In an engine deriving its power from the expansion of gas, a generator having two chambers containing, respectively, a hot and a cold liquid and gas, in combination with one bellows or movable head arranged and adapted to displace and replace both of said liquids, substantially as set forth.

12. In an engine deriving its power from the expansion of gas, a generator having two chambers containing, respectively, a hot and a cold liquid and gas, in combination with one bellows or movable head arranged and adapted to displace and replace both of said liquids and said gas, substantially as set forth.

13. In an engine deriving its power from the expansion of gas, a generator having a hot and a cold chamber holding, respectively, a hot and a cold liquid in contact with gas, in combination with a bellows actuated to automatically cause the transfer of said gas from the hot to the cold chamber, substantially as set forth.

14. In an engine deriving its power from the expansion of gas, a generator having a hot and a cold chamber holding, respectively, a hot and a cold liquid in contact with gas, in combination with a bellows actuated to automatically cause the transfer of said gas from the cold to the hot chamber, substantially as set forth.

15. In an engine deriving its power from the expansion of gas, a generator having a hot and a cold chamber holding, respectively, a hot and a cold liquid in contact with gas, in combination with a bellows actuated to automatically cause the transfer of said gas to and fro from the hot chamber to the cold and from the cold chamber to the hot, substantially as set forth.

16. In an engine deriving its power from the expansion of gas, the combination of a generator containing hot liquid in contact with gas, a regenerator communicating with said gas, and mechanism adapted to automatically prevent the expansion of said gas during each successive reheating thereof until each reheating is nearly completed, substantially as set forth.

17. In an engine deriving its power from the expansion of gas, the combination of a generator containing liquid in contact with gas, a regenerator communicating with said gas, and mechanism adapted to automatically open and close said communication to admit the transfer of said gas through the regenerator while preventing the admission of said liquid thereto, substantially as set forth.

18. In an engine deriving its power from the expansion of gas, the combination of a generator containing liquid in contact with gas, a regenerator communicating with said gas, a valve to open or close said communication, and a liquid arranged to automatically operate said valve, substantially as set forth.

19. In an engine deriving its power from the expansion of gas, the combination of a generator having a chamber containing hot liquid in contact with gas, said liquid being isolated from the pressure of the external atmosphere, a regenerator communicating with said chamber, and mechanism adapted to transfer said gas alternately to and fro through said regenerator from and to said chamber, substantially as and for the purpose set forth.

20. In an engine deriving its power from the expansion of gas, the combination of a generator having two chambers containing, respectively, a hot and a cold liquid in contact with gas, said liquids being isolated from the pressure of the external atmosphere, a regenerator communicating with said chambers, and mechanism adapted to cause said liquids to transfer said gas alternately to and fro through said regenerator from one chamber to the other, substantially as set forth.

21. In an engine deriving its power from the expansion of gas, the combination of a generator having two chambers containing, respectively, a hot and a cold liquid in contact with gas, said liquids being isolated from the pressure of the external atmosphere, a regenerator communicating with said chambers, and a bellows adapted to automatically cause the transfer of said gas alternately to and fro through the regenerator from one chamber to the other, substantially as set forth.

22. In an engine deriving its power from the expansion of gas, the combination of a generator having two chambers containing, respectively, a hot and a cold liquid in contact with gas, said liquids being isolated from the pressure of the external atmosphere, a regenerator communicating with said chambers, a bellows to cause the transfer of the gas to and fro through the regenerator, and a conduit to transmit the power evolved from said gas to the motive mechanism of the engine, substantially as set forth.

23. In an engine deriving its power from the expansion of gas, the combination of a generator having two chambers containing, respectively, a hot and a cold liquid in contact with gas, said liquids being isolated from the pressure of the external atmosphere, a regenerator communicating with said chambers, a bellows to cause the transfer of the gas to and fro through the regenerator, and a conduit to transmit the pressure of the outflowing liquid to the motive mechanism of the engine, substantially as set forth.

24. In an engine deriving its power from the expansion of gas, the combination of a generator having two chambers containing, respectively, a hot and a cold liquid in contact with gas, said liquids being isolated from the pressure of the external atmosphere, a regenerator communicating with said chambers, a conduit connecting the generator with the motive mechanism of the engine, and mechanism to cause an outflow of liquid from said generator into said conduit without lowering the height of the liquid in the chamber supplying said outflow, substantially as set forth.

25. An absorbing-pack, substantially as set forth, arranged and adapted to absorb heat from a gas and transmit it to a cold liquid, substantially as described.

26. The combination of two absorbing-packs, substantially as set forth, one of which is arranged and adapted to absorb heat from a hot liquid and transmit it to a gas and the other of which is arranged and adapted to absorb heat from a gas and transmit it to a cold liquid, substantially as described.

27. An absorbing-pack, substantially as set forth, arranged and adapted to be exposed alternately to the action of a cold liquid and a gas and to absorb heat from said gas and transmit it to said liquid, substantially as described.

28. The combination of two absorbing-packs, substantially as set forth, one of which is arranged and adapted to be exposed alternately to the action of a hot liquid and a gas and to absorb heat from said liquid and transmit it to said gas, and the other of which is arranged and adapted to be exposed alternately to the action of a cold liquid and a gas, and to absorb heat from said gas and transmit it to said cold liquid, substantially as described.

29. An absorbing-pack consisting of a series of closely-spaced plates arranged and adapted to divide a body of gas into a number of sheets or thin sections and to absorb heat from a hot liquid and transmit it to said gas, substantially as set forth.

30. An absorbing-pack consisting of a series of closely-spaced plates arranged and adapted to divide a body of hot liquid into a number of sheets or thin sections and to absorb heat from said liquid and transmit it to a gas, substantially as set forth.

31. The combination of a generator constructed to hold a cold liquid in contact with gas, said liquid being isolated from the pressure of the external atmosphere, and an absorbing-pack adapted to absorb heat from said gas and transmit it to said liquid, substantially as and for the purpose set forth.

32. The combination of a generator containing two chambers constructed to hold, respectively, a hot and a cold liquid in contact with gas, said liquids being isolated from the pressure of the external atmosphere, and absorbing-packs arranged and adapted to absorb heat from said hot liquid and transmit it to said gas in one of said chambers and to absorb heat from said gas and transmit it to said cold liquid in the other chamber, substantially as set forth.

33. The combination of a generator constructed to hold a cold liquid in contact with gas, said liquid being isolated from the pressure of the external atmosphere, and an absorbing-pack arranged and adapted to be automatically exposed to the action of said liquid and gas alternately and to absorb heat from said gas and transmit it to said liquid, substantially as set forth.

34. The combination of a generator containing two chambers constructed to hold, respectively, a hot and a cold liquid in contact with gas, said liquids being isolated from the pressure of the external atmosphere, and two absorbing-packs, one of which is arranged and adapted to be exposed alternately to the action of said hot liquid and gas and to absorb heat from said hot liquid and transmit it to said gas, and the other of which is arranged and adapted to be exposed alternately to the action of said cold liquid and gas and to absorb heat from said gas and transmit it to said cold liquid, substantially as set forth.

35. The combination of a generator constructed to hold a hot liquid in contact with gas, said liquid being isolated from the pressure of the external atmosphere, and an absorbing-pack consisting of a series of closely-spaced plates arranged and adapted to divide said liquid or gas into a number of sheets or thin sections and to absorb heat from said liquid and transmit it to said gas, substantially as set forth.

36. The combination of a generator constructed to hold a cold liquid in contact with gas, said liquid being isolated from the pressure of the external atmosphere, and an absorbing-pack consisting of a series of closely-spaced plates arranged and adapted to divide said liquid or gas into a number of sheets or thin sections and to absorb heat from said gas and transmit it to said liquid, substantially as set forth.

37. In an engine deriving its power from the expansion of gas, the combination of a generator having hot liquid in contact with gas, said liquid being isolated from the pressure of the external atmosphere, an absorbing-pack adapted to absorb heat from said liquid and transmit it to said gas, a regenerator communicating with said gas, and heating coils or apparatus adapted to convey a supply of heat to said liquid, substantially as set forth.

38. In an engine deriving its power from the expansion of gas, the combination of a generator having hot and cold liquids in contact with gas, said liquids being isolated from the pressure of the external atmosphere, an absorbing-pack adapted to absorb heat from said gas and transmit it to said liquid, a regenerator communicating with said gas, and cooling coils or apparatus adapted to convey a supply of cooling-fluid to said cold liquid, substantially as set forth.

39. In an engine deriving its power from the expansion of gas, the combination of a generator having two chambers containing, respectively, a hot and a cold liquid in contact with gas, said liquids being isolated from the pressure of the external atmosphere, absorbing-packs adapted to absorb heat from said hot liquid and transmit it to said gas in one of said chambers and to absorb heat from said gas and transmit it to said cold liquid in said other chamber, and heating coils or apparatus adapted to convey a supply of heat to said hot liquid, and cooling coils or apparatus adapted to supply a cooling-fluid to said cold liquid, substantially as set forth.

40. In an engine deriving its power from the expansion of gas, the combination of a generator containing a hot liquid in contact with gas and mechanism adapted to transmit heat from steam to said liquid for the evolution of motive power, substantially as set forth.

41. In an engine deriving its power from the expansion of gas, the combination of a generator containing a hot and a cold liquid in contact with gas, mechanism adapted to transmit heat from steam to said hot liquid, and an absorbing-pack arranged to absorb said heat from the hot liquid and transmit it to the gas for the evolution of motive power, substantially as set forth.

42. In an engine deriving its power from the expansion of gas, the combination of a generator containing a hot and a cold liquid in contact with gas, mechanism adapted to transmit heat from steam to the hot liquid, and two absorbing-packs, one of which is arranged to absorb said heat from the hot liquid and transmit it to the gas and the other of which is arranged to absorb the heat from said gas and transmit it to said cold liquid, substantially as and for the purpose set forth.

43. In an engine deriving its power from the expansion of gas, the combination of a generator containing a hot and a cold liquid and gas, mechanism adapted to transmit heat from steam to the hot liquid, an absorbing-pack arranged to absorb said heat from the hot liquid and transmit it to the gas, and a bellows or movable head actuated to cause the transfer of said gas from the hot liquid to the cold, substantially as and for the purpose set forth.

44. In an engine deriving its power from the expansion of gas, the combination of a generator having two chambers containing, respectively, a hot and a cold liquid in contact with gas, said liquids being isolated from the pressure of the external atmosphere, mechanism adapted to transmit heat from steam to the hot liquid, an absorbing-pack arranged to absorb said heat from the hot liquid and transmit it to the gas, a regenerator communicating with said gas, and a bellows or movable head actuated to cause the transfer of said gas to and fro through said regenerator from the hot chamber to the cold and from the cold chamber to the hot, substantially as and for the purpose set forth.

45. In an engine deriving its power from the expansion of gas, two generators, each generator containing hot and cold liquid and gas, in combination with mechanism adapted to cause the liquid outflowing from either generator to effect an inflow of liquid to the other generator, substantially as set forth.

46. In an engine deriving its power from the expansion of gas, two generators, each generator containing gas and hot and cold liquid, in combination with mechanism adapted to cause the expansion of the heated gas in either generator to compress the cold gas in the other generator, substantially as set forth.

47. In an engine deriving its power from the expansion of gas, the combination of two generators, each generator containing hot and cold liquid and gas, two counter-balances adapted to facilitate or control the movements of said liquids, and mechanism adapted to actuate both of said counter-balances simultaneously, substantially as set forth.

48. In an engine deriving its power from the expansion of gas, the combination of two generators, each generator having a hot and a cold chamber containing, respectively, a hot and a cold liquid and gas, said liquids being isolated from the pressure of the external atmosphere, and mechanism adapted to transmit motion from said engine to the contents of both generators simultaneously, substantially as set forth.

49. In an engine deriving its power from the expansion of gas, the combination of two generators, each generator having a hot and a cold chamber containing, respectively, a hot and a cold liquid and gas, and mechanism adapted to transfer said gas to and fro from one chamber to the other in each said generator simultaneously, substantially as set forth.

50. In an engine deriving its power from the expansion of gas, the combination of two generators, each generator having a hot and a cold chamber containing, respectively, a hot and a cold liquid and gas, said liquids being isolated from the pressure of the external atmosphere, and mechanism adapted to transfer said gas to and fro from the hot chamber to the cold in one generator and from the cold chamber to the hot in the other generator simultaneously, substantially as set forth.

51. In an engine deriving its power from the expansion of gas, the combination of two generators, each generator having a hot and a cold chamber containing, respectively, a hot and a cold liquid and gas, said liquids being isolated from the pressure of the external atmosphere, and mechanism adapted to cause the gas in each generator alternately to attain its maximum pressure and to transmit said pressure to the motive mechanism of the engine, substantially as set forth.

52. In an engine deriving its power from the expansion of gas, the combination of two generators, each generator having a hot and a cold chamber containing, respectively, a hot and a cold liquid and gas, and mechanism adapted to cause the liquid in each generator alternately to attain its maximum pressure and to transmit said pressure to the motive mechanism of the engine, substantially as set forth.

53. In an engine deriving its power from the expansion of gas, the combination of two generators, each generator having a hot and a cold chamber containing, respectively, a hot and a cold liquid and gas, conduits connecting the two generators with the opposite ends of the piston-chamber, and mechanism adapted to cause each end of the power-piston to be alternately actuated by the maximum pressure of its respective generator, substantially as set forth.

In testimony that we claim the foregoing we have hereunto set our hands this 1st day of February, 1886.

JAMES S. BALDWIN.
BENJAMIN W. BRADFORD.

Witnesses:
CHARLES H. PELL,
NATHAN HARPER.